United States Patent
Tokumaru (10) Patent No.: US 8,460,589 B2
(45) Date of Patent: Jun. 11, 2013

(54) METHOD FOR PRODUCING CERAMIC HONEYCOMB FILTER

(75) Inventor: Shinya Tokumaru, Miyako-gun (JP)

(73) Assignee: Hitachi Metals, Ltd., Tokyo (JP)

( * ) Notice: Subject to any disclaimer, the term of this patent is extended or adjusted under 35 U.S.C. 154(b) by 114 days.

(21) Appl. No.: 12/280,888

(22) PCT Filed: Sep. 28, 2006

(86) PCT No.: PCT/JP2006/319384
§ 371 (c)(1),
(2), (4) Date: Aug. 27, 2008

(87) PCT Pub. No.: WO2008/038392
PCT Pub. Date: Apr. 3, 2008

(65) Prior Publication Data
US 2009/0072431 A1    Mar. 19, 2009

(51) Int. Cl.
*B29C 47/00* (2006.01)

(52) U.S. Cl.
USPC ...... 264/177.12; 264/259; 264/273; 264/275; 264/276; 264/277

(58) Field of Classification Search
USPC ............ 264/177.12, 259, 273, 275–279
See application file for complete search history.

(56) References Cited

U.S. PATENT DOCUMENTS

| | | | |
|---|---|---|---|
| 4,557,773 A | 12/1985 | Bonzo | |
| 4,923,655 A * | 5/1990 | Oshima et al. | 264/634 |
| 6,840,976 B2 | 1/2005 | Vance et al. | |
| 7,052,735 B2 | 5/2006 | Nate et al. | |
| 2002/0178707 A1 | 12/2002 | Vance et al. | |
| 2004/0110635 A1 * | 6/2004 | Addiego et al. | 502/439 |
| 2004/0171483 A1 * | 9/2004 | Takeshima | 502/304 |
| 2004/0198599 A1 | 10/2004 | Kato et al. | |
| 2005/0221014 A1 | 10/2005 | Nate et al. | |
| 2006/0107641 A1 | 5/2006 | Kasai et al. | |
| 2006/0131782 A1 | 6/2006 | Mudd et al. | |
| 2007/0037703 A1 | 2/2007 | Muroi | |

FOREIGN PATENT DOCUMENTS

| | | |
|---|---|---|
| EP | 1516658 A1 | 3/2005 |
| EP | 1 640 068 A1 | 3/2006 |
| JP | 58-37480 A | 3/1983 |
| JP | 10-314522 A | 12/1998 |
| JP | 2003-230808 A | 8/2003 |
| JP | 2004-25098 A | 1/2004 |

(Continued)

OTHER PUBLICATIONS

Chinese Office Action issued Oct. 13, 2010 in Application No. 200680053311.8.
Supplementary European Search Report issued in Application No. 06798432.8 dated Mar. 29, 2012.

(Continued)

*Primary Examiner* — Larry Thrower
*Assistant Examiner* — Xue Liu
(74) *Attorney, Agent, or Firm* — Sughrue Mion, PLLC (57) ABSTRACT

A method for producing a ceramic honeycomb filter by immersing an end surface of a ceramic honeycomb structure having a lot of flow paths partitioned by cell walls in a plugging material slurry in a container to introduce the plugging material slurry into the predetermined flow paths to form plugs, and taking the ceramic honeycomb structure provided with the plugs out of the container horizontally.

8 Claims, 11 Drawing Sheets

FOREIGN PATENT DOCUMENTS

| | | |
|---|---|---|
| JP | 2004-290766 A | 10/2004 |
| JP | 2006-95352 A | 4/2006 |
| JP | 2006-167680 A | 6/2006 |
| KR | 10-2004-0023794 A | 3/2004 |
| KR | 10-2004-0089468 A | 10/2004 |

OTHER PUBLICATIONS

Notice of Grounds for Rejection, dated Jan. 30, 2013, from the Korean Patent Office, in corresponding Korean Patent Application No. KR10-2008-7021093, along with an English translation thereof.

* cited by examiner

METHOD FOR PRODUCING CERAMIC HONEYCOMB FILTER

CROSS REFERENCE TO RELATED APPLICATION

This application is a National Stage of International Application No. PCT/JP2006/319384 filed Sep. 28, 2006.

FIELD OF THE INVENTION

The present invention relates to a method for producing a ceramic honeycomb filter, particularly to a method for producing a ceramic honeycomb filter by immersing an end portion of a ceramic honeycomb structure in a plugging material slurry to form plugs.

BACKGROUND OF THE INVENTION

Figure 3A:
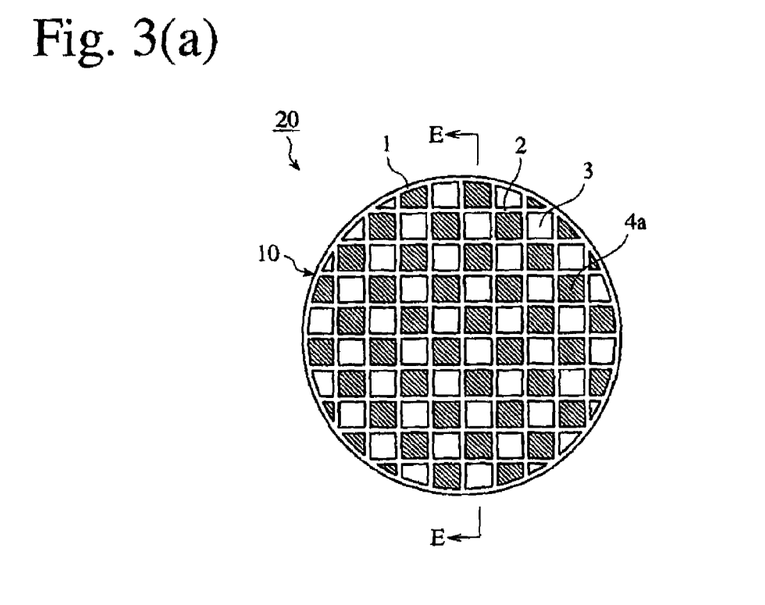
FIG. 3(a) is a front view showing a ceramic honeycomb filter provided with plugs in a checkerboard pattern.
Figure 3B:
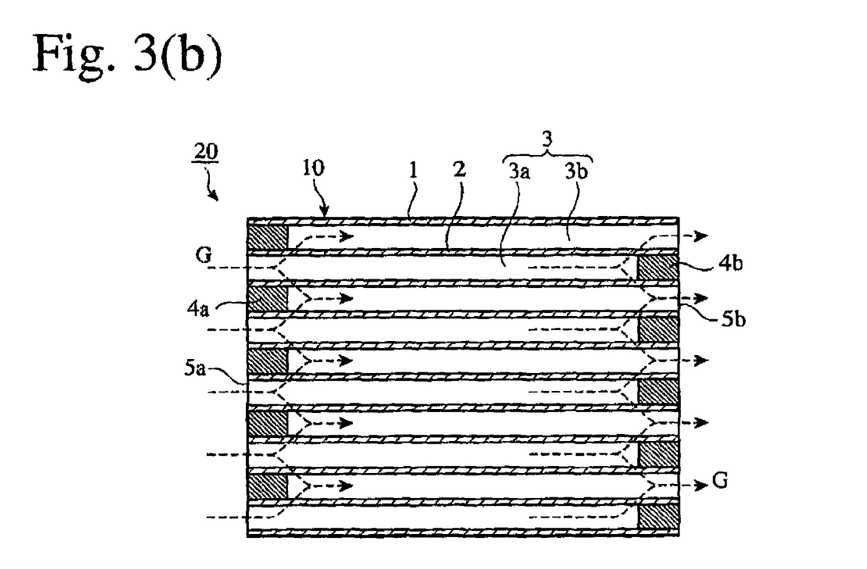
FIG. 3(b) is a cross-sectional view taken along the line E-E in FIG. 3(a).

To remove carbon-based particulate matter from exhaust gases emitted from diesel engines, a ceramic honeycomb filter comprising a ceramic honeycomb structure with both ends alternately sealed has been used. As shown in FIGS. 3(a) and 3(b), a ceramic honeycomb structure 20 comprises a ceramic honeycomb structure 10 comprising porous cell walls 2 which form a lot of flow paths 3 and an outer peripheral wall 1; and plugs 4a, 4b alternately sealing both end surfaces 5a, 5b of the flow paths 3 in a checkerboard pattern. An exhaust gas G containing particulate matter enters the flow paths 3a that are open at the inlet end 5a, passes through the cell walls 2, and exits from the flow paths 3b that are open at the outlet end surface 5b via adjacent flow paths 3b. During this process, particulate matter in the exhaust gas G is captured by pores (not shown) in the cell walls 2.

Figure 4A:
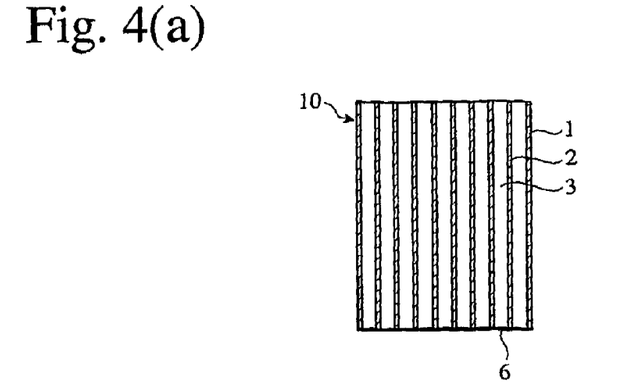
FIG. 4(a) is a cross-sectional view showing a ceramic honeycomb structure having a resin film attached to one end in a conventional method.
Figure 4B:
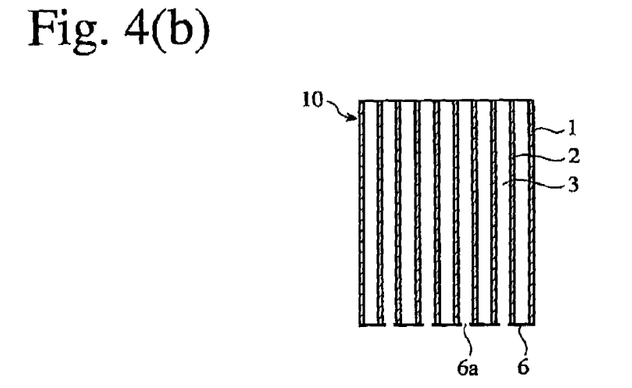
FIG. 4(b) is a cross-sectional view showing a film perforated in a checkerboard pattern by the conventional method.
Figure 4C:
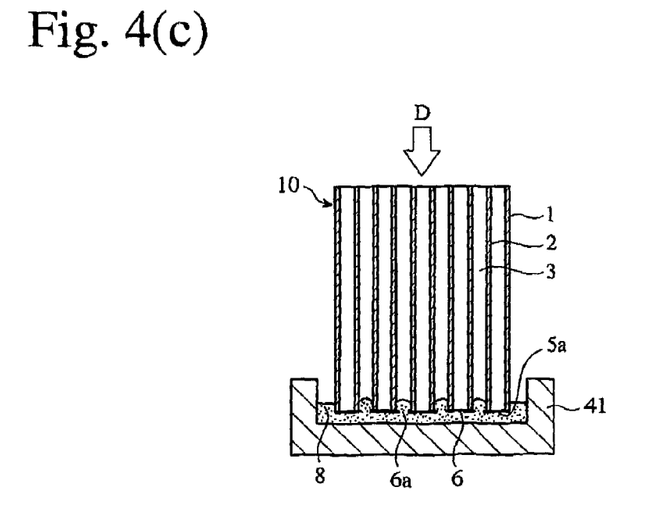
FIG. 4(c) is a cross-sectional view showing a ceramic honeycomb structure immersed in a plugging material slurry in a container in the conventional method.
Figure 4D:
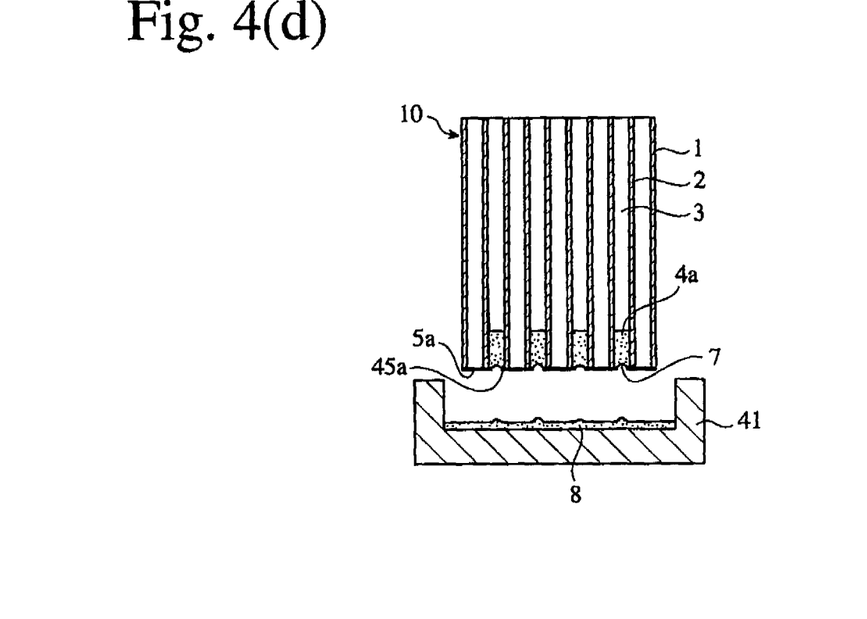
FIG. 4(d) is a cross-sectional view showing the ceramic honeycomb structure taken out of the container in the conventional method.

The formation of plugs in both end portions of a ceramic honeycomb structure has conventionally been conducted, for example, by the method shown in FIGS. 4(a) to 4(e). A resin film 6 is attached to an end surface 5a of the ceramic honeycomb structure 10 as shown in FIG. 4(a), and provided with holes 6a by laser beam such that the flow paths of the ceramic honeycomb structure are arranged in a checkerboard pattern as shown in FIG. 4(b). Thereafter, the ceramic honeycomb structure 10 is immersed in a plugging material slurry 8 comprising ceramic powder and a dispersing medium in a container 40 as shown in FIG. 4(c). During immersion, the ceramic honeycomb structure 10 is pushed downward (shown by the arrow D). The plugging material slurry 8 enters the predetermined flow paths 3 through the holes 6a in the sealing film 6 to form plugs 4a. After the ceramic honeycomb structure 10 is taken out of the container 40. plugs 4b are similarly formed in the other flow paths from the other end 5b. The plugs 4a, 4b are then sintered, so that the end surfaces 5a, 5b of the ceramic honeycomb filter 20 are sealed in a checkerboard pattern.

Figure 4E:
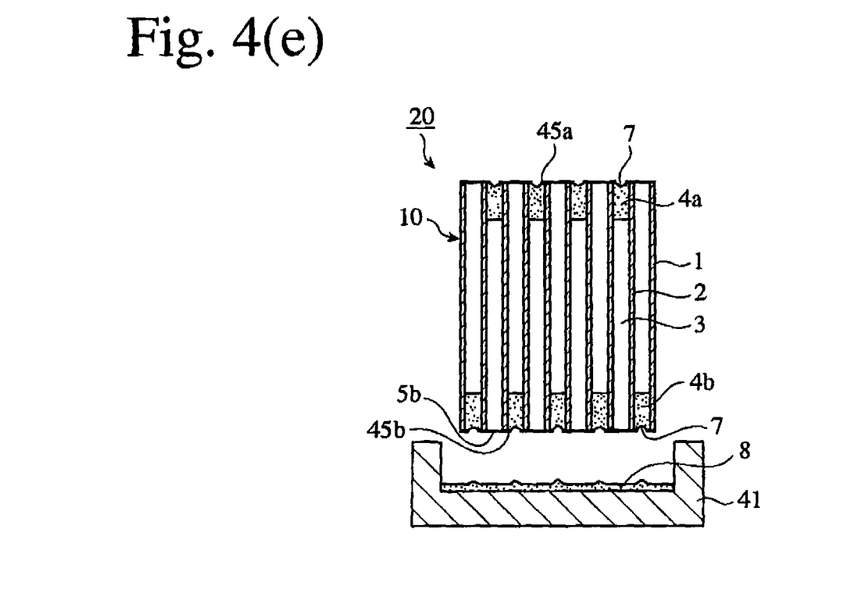
FIG. 4(e) is a cross-sectional view showing plugs formed on both end surface sides of the ceramic honeycomb filter by the conventional method.
Figure 5A:
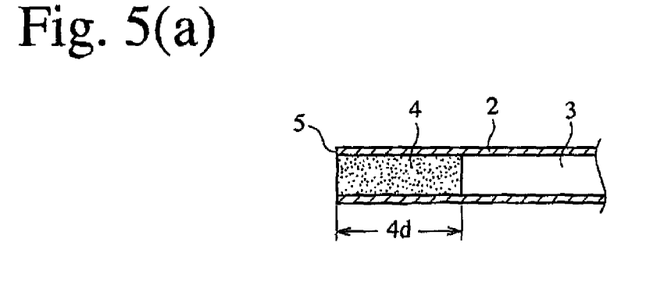
FIG. 5(a) is a partial cross-sectional view showing a recess-free plug formed in the ceramic honeycomb structure.
Figure 5B:
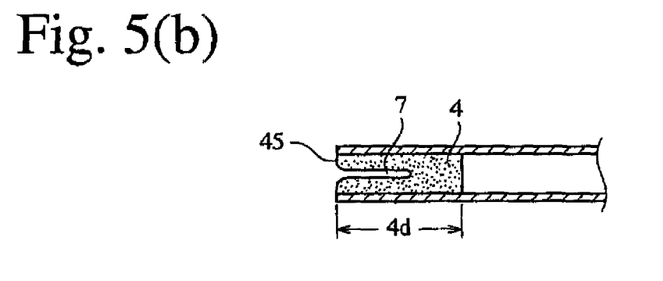
FIG. 5(b) is a partial cross-sectional view showing an example of a recess generated in the plug formed in the ceramic honeycomb structure.
Figure 5C:
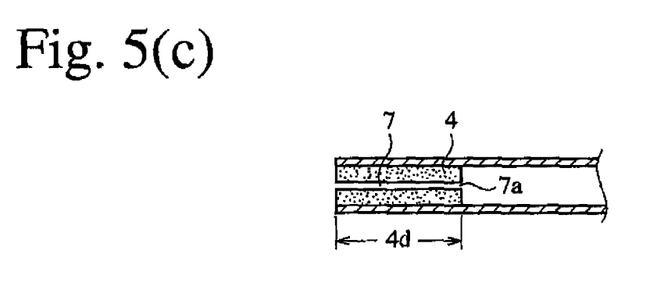
FIG. 5(c) is a partial cross-sectional view showing an example of a recess penetrating the plug formed in the ceramic honeycomb structure.
Figure 5D:
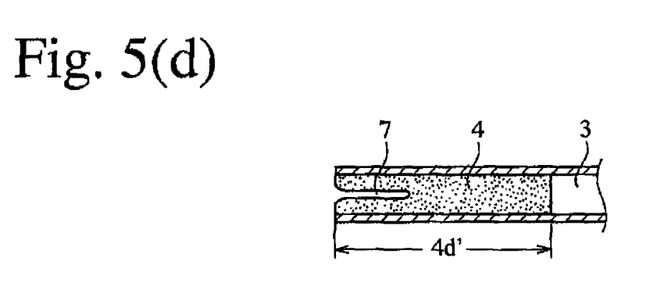
FIG. 5(d) is a partial cross-sectional view showing such a long plug formed in the ceramic honeycomb structure that a recess does not penetrate it.

In the conventional method shown in FIG. 4(e), however, recesses 7 are likely generated at end surfaces 45a and 45b of the plugs 4a, 4b. FIGS. 5(a) to 5(d) show a plug 4 in a flow path 3 in an enlarged manner. FIG. 5(a) shows a normal plug 4, and FIGS. 5(b) to 5(c) show a plug 4 having a recess 7 generated in its end 45. In the extreme case shown in FIG. 5(c), the recess 7 is a through-hole 7a, through which particulate matter in an exhaust gas leaks. Although the penetration of the recess 7 can be avoided by elongating the plug from 4 to 4d' as shown in FIG. 5(d), the elongation of the plug 4 undesirably makes the flow path 3 (corresponding to the effective area of the cell wall 2 for capturing particulate matter in an exhaust gas) shorter.

Figure 6A:
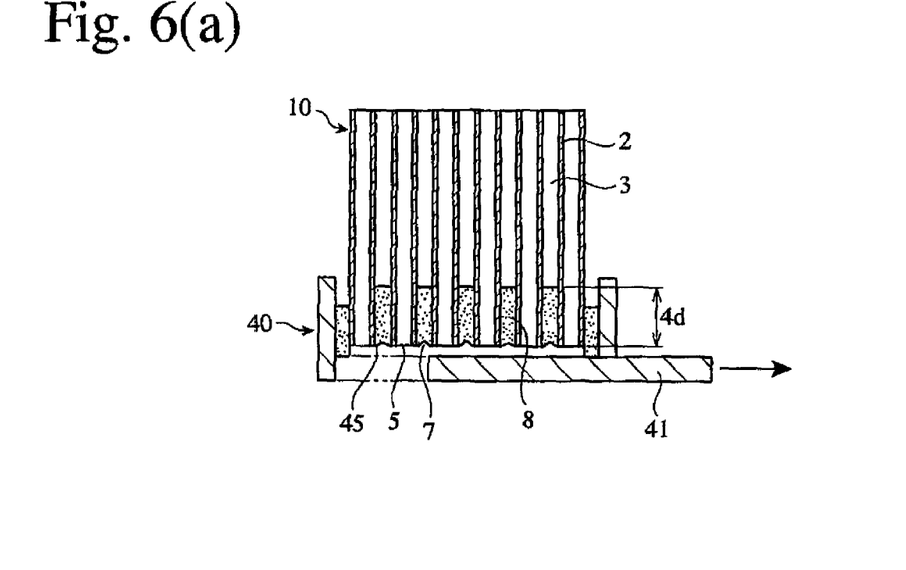
FIG. 6(a) is a cross-sectional view showing the step of sliding a bottom plate horizontally in the plugging method described in JP 2004-25098 A.
Figure 6B:
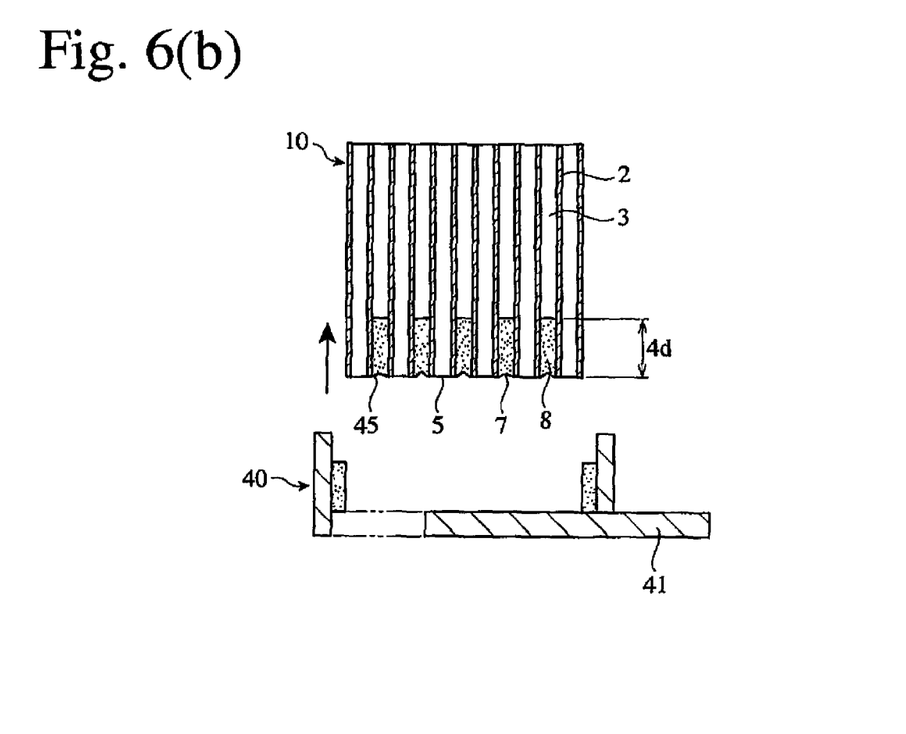
FIG. 6(b) is a cross-sectional view showing the step of lifting a ceramic honeycomb structure from a container, from which a bottom plate has been removed, in the plugging method described in JP 2004-25098 A.

To avoid the generation of recesses during the formation of plugs, as shown in FIGS. 6(a) and 6(b), JP 2004-25098A discloses a method comprising pressing a plugging material slurry 8 in a container 40 into flow paths 3 of a ceramic honeycomb structure 10 to form plugs 4; sliding a bottom plate 41 of the container 40 to open the bottom of the container 40; and taking the ceramic honeycomb structure 10 out of the container 40 by lifting. JP 2004-25098 A discloses that if the bottom of the container 40 is opened, negative pressure is not applied to the plugs 4 when the ceramic honeycomb structure 10 is lifted, so that the generation of the recesses 7 can be avoided. As a result of experiment, however, the inventors have found that in the method of JP 2004-25098 A, contact resistance would be too high to slide the bottom plate of the container 40 if the ceramic honeycomb structure 10 with the plugging material slurry 8 injected were not lifted at the least. If the bottom plate of the container 40 were slid after the ceramic honeycomb structure 10 is lifted, negative pressure would be applied to the plugging material slurry 8 forming the plugs 4 while opening the bottom of the container 40, so that the plugging material slurry 8 undergoes sudden pressure rise from reduced pressure to atmospheric pressure, making it likely to generate the recesses 7 at the ends 45 of the plugs 4.

Figure 6C:
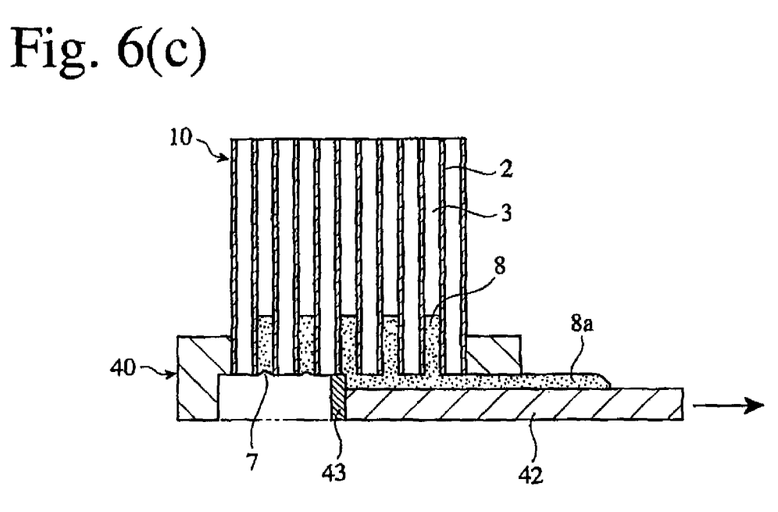
FIG. 6(c) is a cross-sectional view showing the plugging method described in JP 2004-290766 A.

JP 2004-290766 A discloses a method comprising pressing a slurry 8 in a container (not shown) into flow paths 3; and removing a slurry 8a attached to the end surface 5 of the ceramic honeycomb structure 10 with a spatula 43 while separating the ceramic honeycomb structure 10 from the container 40 by sliding a bottom plate 42 of the container 40, as shown in FIG. 6(c). This reference discloses that the forced separation of the slurry 8 inside the flow paths 3 from that outside the flow paths 3 can prevent the generation of recesses due to the negative pressure and the viscosity of the slurry. However, because the slurry 8a attached to the end surface of the honeycomb structure is removed before solidified in the method of JP 2004-290766 A, the recesses 7 may be generated in the course of drying the slurry 8.

OBJECT OF THE INVENTION

Accordingly, an object of the present invention is to provide a method for producing a ceramic honeycomb filter while preventing the generation of recesses in end portions of plugs.

DISCLOSURE OF THE INVENTION

As a result of extensive investigation in view of the above object, the inventors have come to notice that when a ceramic honeycomb structure is lifted from a container after it is immersed in a plugging material slurry to form plugs in predetermined flow paths, recesses are generated by negative pressure, thereby discovering that the generation of recesses can be avoided if the ceramic honeycomb structure is taken out of the container horizontally. The inventors have further noted that recesses are also generated by the shrinkage of plugs during drying, thereby discovering that the generation of recesses can be avoided by dewatering before drying the plugs. The present invention has been completed based on such findings.

Thus, the first method of the present invention for producing a ceramic honeycomb filter comprises immersing an end portion of a ceramic honeycomb structure having a lot of flow paths partitioned by cell walls in a plugging material slurry in a container to introduce the plugging material slurry into the predetermined flow paths to form plugs; and taking the ceramic honeycomb structure provided with the plugs out of the container horizontally.

An end surface of the taken-out ceramic honeycomb structure is preferably brought into contact with a water-absorbing member.

The second method of the present invention for producing a ceramic honeycomb filter comprises immersing an end portion of a ceramic honeycomb structure having a lot of flow paths partitioned by cell walls in a plugging material slurry in a container, thereby introducing the plugging material slurry into the predetermined flow paths to form plugs, and forming a plugging material layer on the end surface of the ceramic honeycomb structure; taking the ceramic honeycomb structure together with the plugging material layer out of the container horizontally; and bringing the plugging material layer into contact with a water-absorbing member.

The plugging material layer is preferably removed after it is brought into contact with the water-absorbing member. The plugging material layer preferably has a thickness of 0.5 to 5 mm.

An end portion of the ceramic honeycomb structure is preferably immersed in water before being immersed in the plugging material slurry in the container.

The container used in the first and second methods of the present invention preferably has such a structure that at least part of a sidewall is detachable over a sufficient width to slide the ceramic honeycomb structure.

DESCRIPTION OF THE BEST MODE OF THE INVENTION

[1] Structure of Ceramic Honeycomb Filter

As shown in FIGS. 3(a) and 3(b), the ceramic honeycomb filter 20 produced by the method of the present invention comprises a ceramic honeycomb structure 10 having a lot of flow paths 3 partitioned by cell walls 2; plugs 4a formed in a checkerboard pattern on the side of one end surface 5a (on the exhaust gas-introducing side) of the flow paths 3b; and the plugs 4b formed in a checkerboard pattern on the side of the other end surface 5b (on the exhaust gas-exiting side) of the flow paths 3a where the plugs 4a are not formed. Each plug 4a, 4b preferably has a length of 5 to 20 mm. When the plugs 4a, 4b are shorter than 5 mm, their adhesion to the cell walls 2 is so low that the plugs 4a, 4b may be detached from the cell walls 2 by mechanical vibration. When the plugs 4a, 4b are longer than 20 mm, the difference in thermal expansion and temperature between the plugs 4a, 4b and the cell walls 2 generates too high thermal shock stress, resulting in cracking in interfaces between the plugs 4a, 4b and the cell walls 2.

[2] Methods for Producing Ceramic Honeycomb Filter

The first method of the present invention for producing a ceramic honeycomb filter comprises immersing an end portion of a ceramic honeycomb structure in a plugging material slurry in a container to introduce the plugging material slurry into the predetermined flow paths to form plugs; and taking the ceramic honeycomb structure provided with the plugs out of the container horizontally.

The second method of the present invention for producing a ceramic honeycomb filter comprises immersing an end portion of a ceramic honeycomb structure having a lot of flow paths partitioned by cell walls in a plugging material slurry in a container, thereby introducing the plugging material slurry into the predetermined flow paths to form plugs, and forming a plugging material layer on the end surface of the ceramic honeycomb structure; taking the ceramic honeycomb structure together with the plugging material layer out of the container horizontally; and bringing the plugging material layer into contact with a water-absorbing member.

(1) First Method

Figure 1A:
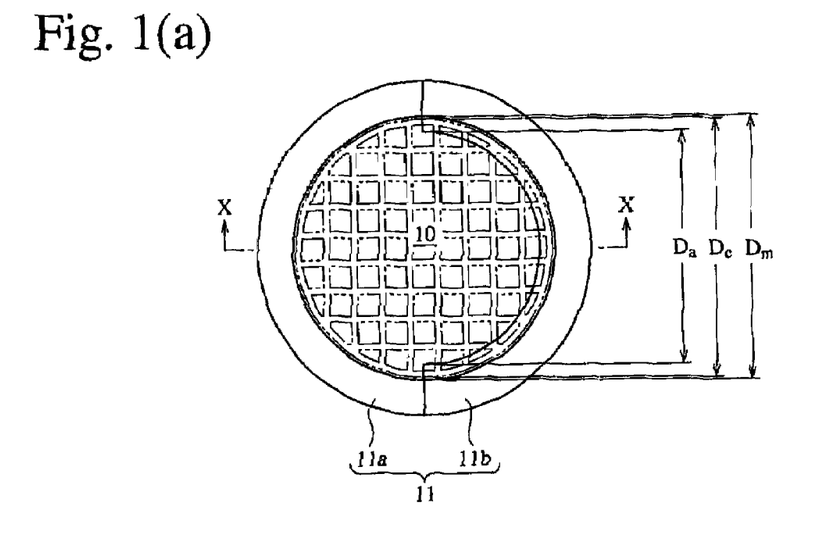
FIG. 1(a) is a front view showing the step of immersing a ceramic honeycomb structure in a plugging material slurry in a container in the first method of the present invention.
Figure 1B:
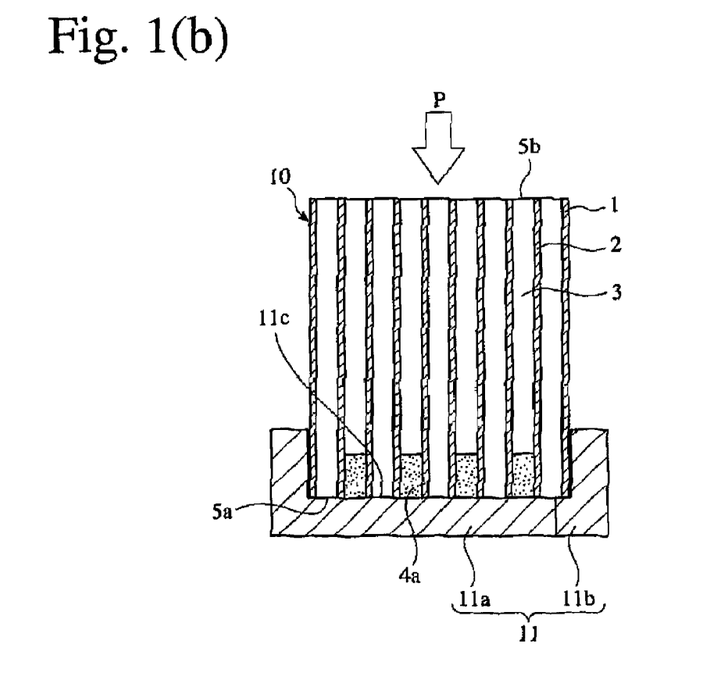
FIG. 1(b) is a cross-sectional view taken along the line X-X in FIG. 1(a).
Figure 1C:
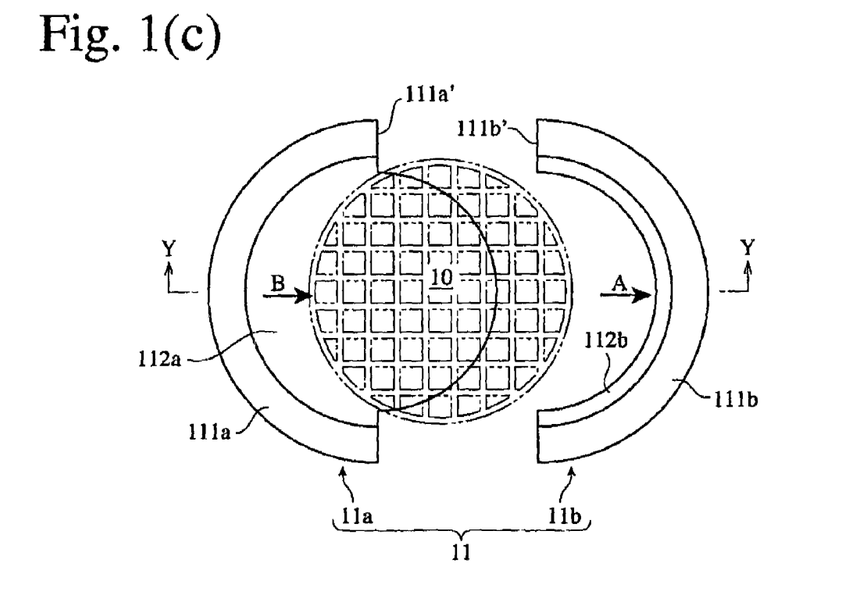
FIG. 1(c) is a front view showing the step of taking the ceramic honeycomb structure out of a separable container by sliding a container piece of the separable container.

As shown in FIGS. 1(a) to 1(d), the container 11 used in the present invention to take out the ceramic honeycomb structure 10 provided with plugs horizontally is preferably a so-called "separable container" constituted by integrally combined container pieces 11a and 11b that are easily separable horizontally. In the case of a cylindrical, ceramic honeycomb structure 10, for example, the separable container 11 is composed of a pair of container pieces 11a and 11b. The container piece 11a comprises a sidewall 111a having parting surfaces 111a' extending along the diameter of the container piece 11a, and a bottom portion 112a constituting most of the bottom of the container 11. The container piece 11b comprises a sidewall 11b having parting surfaces 111b' extending along the diameter of the container piece 11a, and a bottom portion 112b slightly extending inward from the sidewall 111b. As shown in FIGS. 1(a) and 1(c), the bottom portion 112a has a circular shape with a diameter Da, and the bottom portion 112b has an arcuate shape complementary to the bottom portion 112a, so that they constitute the bottom of the separable container 11 when combined.

The inner diameter Dm of the separable container 11, corresponding to the inner diameters of the sidewalls 111a and 111b, is preferably slightly larger than the outer diameter Dc of the ceramic honeycomb structure 10. If the condition of Dm>Dc is not satisfied, the ceramic honeycomb structure 10 cannot of course be immersed in the plugging material slurry 8 in the separable container 11. The diameter Da of the bottom portion 112a of the container piece 11a may be the same as the inner diameter Dm of the separable container 11 (the bottom portion 112b may not be needed). It is preferable that the ceramic honeycomb structure 10 slightly projects from the bottom portion 112a of the container piece 11a when the container 11 is separated, because it makes it easy to take the ceramic honeycomb structure 10 out of the container 11 horizontally. Thus, the condition of Dc>Da is preferably met. To reduce resistance to the horizontal sliding of the container piece 11b, the container piece 11b preferably has as small a contact area with the bottom of the ceramic honeycomb structure 10 as possible. Thus, Da is preferably as close to Dc as possible. In addition, the bottom portion 112b of the container piece 11b preferably has a width to some extent, so that a peripheral portion of the ceramic honeycomb structure 10 projects from the bottom portion 112a of the container piece 11a when the container piece 11b is separated. Accordingly, the bottom portion 112b is preferably as narrow as ⅓ or less, more preferably ¹⁄₁₀ or less, most preferably ¹⁄₁₀ to ¹⁄₂₀, of the bottom portion 112a.

Although the separable container with an arcuate parting line has been described above, the present invention is not limited to the use of such separable container, and a separable container of any shape may be used, if it is met that Dm is larger than Dc, that the container pieces to be combined can be easily positioned, and that the ceramic honeycomb structure 10 is easily taken out of the separated container.

Figure 1D:
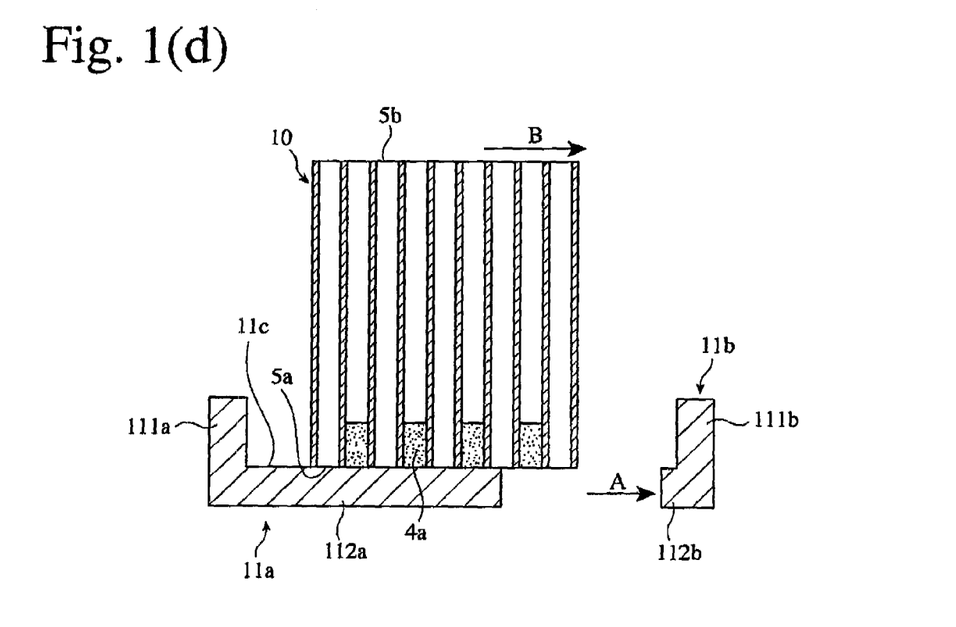
FIG. 1(d) is a cross-sectional view taken along the line Y-Y in FIG. 1(c).

As shown in FIGS. 1(c) and 1(d), when the container piece 11b is slid horizontally [rightward as shown by the arrow A in FIGS. 1(c) and 1(d)], the ceramic honeycomb structure 10 having flow paths 3 into which the plugging material slurry 8 is pressed can be slid horizontally (in a direction shown by the arrow B) along the inner bottom surface 11c of the container piece 11a, so that the ceramic honeycomb structure 10 can be taken out of the container 11. At this time, either the ceramic honeycomb structure 10 or the container piece 11a may be moved. To reduce the contact resistance, it is preferable to slide the ceramic honeycomb structure 10 while rotating.

Figure 1E:
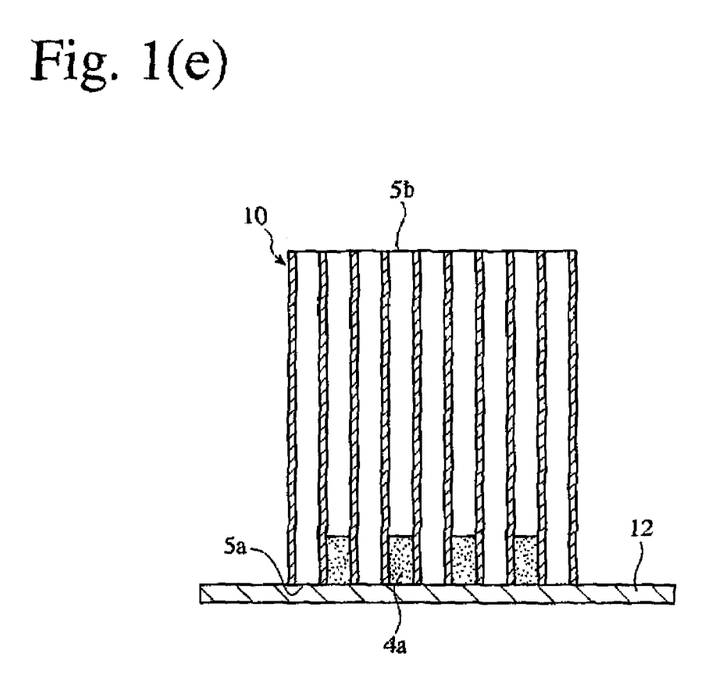
FIG. 1(e) is a cross-sectional view showing the step of bringing the plug-side end surface of the ceramic honeycomb structure taken out of the container into contact with a water-absorbing member.

As shown in FIG. 1(e), when the end surface 5a of the taken-out ceramic honeycomb structure 10 is brought into contact with a water-absorbing member 12, water in the plugging material slurry 8 forming the plugs 4a rapidly moves to the water-absorbing member 12, quickly solidifying a lower end portions of the plugs 4a and thus preventing the generation of the recesses 7. Contact with the water-absorbing member 12 is preferably conducted immediately after the ceramic honeycomb structure 10 is taken out of the container 11. Because water in the end portions of the plugs or a plugging material layer 9 described below need only be sufficiently absorbed, the contact time is preferably 10 seconds to 6 minutes, more preferably 1-5 minutes. It is preferable to heat the end portions of the plugs or the plugging material layer 9 in contact with the water-absorbing member 12, to remove more water.

The ceramic honeycomb structure 10 should be stably placed on the water-absorbing member 12 without damaging the end surface 5a of the ceramic honeycomb structure 10 and the plugs 4 formed therein. Examples of such water-absorbing member 12 include paper, woven or unwoven fabrics of natural or synthetic fibers, and foamed plastics. Examples of plastics for the water-absorbing member 12 include polyesters and polyvinyl alcohol. The water-absorbing member 12 is of course not limited to the above-described materials, but any other materials satisfying the aforementioned condition may be used.

(2) Second Method

Because the second method differs from the first method in that the plugging material layer 9 is formed on the end surface 5a of the ceramic honeycomb structure 10 while pressing the plugging material slurry 8 into the flow paths 3 and removed in a subsequent step, detailed explanation will be given to the plugging material layer 9 below.

Figure 2A:
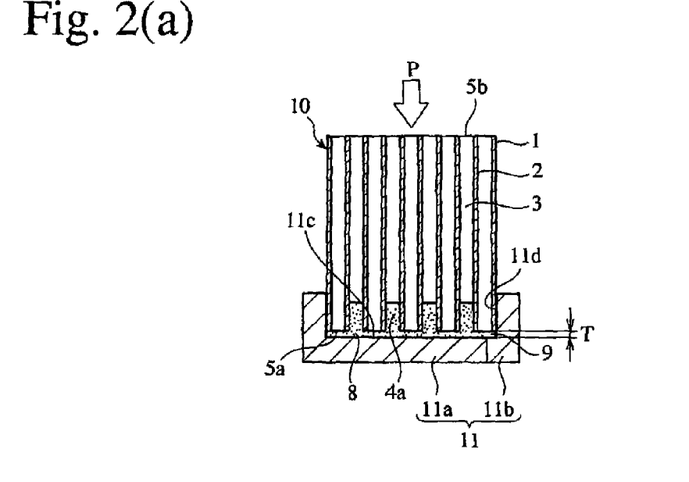
FIG. 2(a) is a cross-sectional view showing the step of immersing a ceramic honeycomb structure in a plugging material slurry in a container in the second method of the present invention.

As shown in FIG. 2(a), while one end surface 5a side of the ceramic honeycomb structure 10 is immersed in the plugging material slurry 8 in the container 11, a pressing force P for introducing the plugging material slurry 8 into the flow paths 3 is adjusted, such that a layer 9 of the plugging material slurry 8 having a thickness T of 0.5 to 5 mm is formed on the end surface 5a of the ceramic honeycomb structure 10, with the plugs 4a formed in the flow paths. The formation of the plugging material layer 9 prevents recesses 7b generated on a surface 91 of the plugging material layer 9 from reaching the plugs 4a.

Figure 2B:
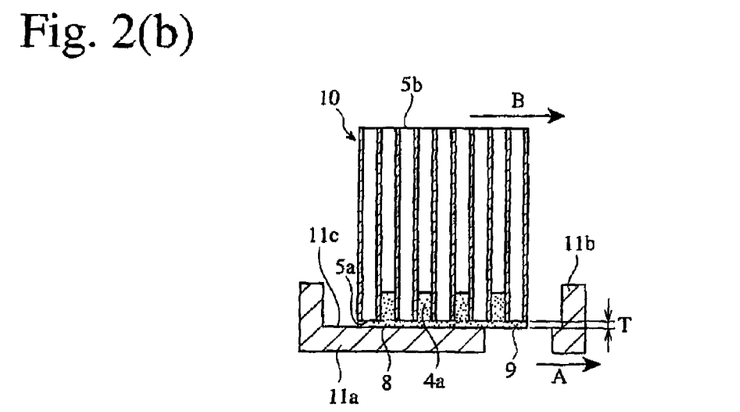
FIG. 2(b) is a cross-sectional view showing the step of taking the ceramic honeycomb structure out of a separable container after a container piece of the separable container is slid.
Figure 2C:
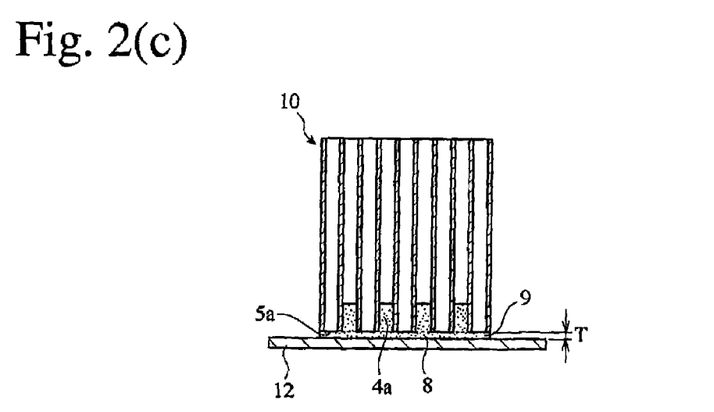
FIG. 2(c) is a cross-sectional view showing the step of bringing the plug-side end surface of the ceramic honeycomb structure taken out of the container into contact with a water-absorbing member.

As shown in FIG. 2(b), after the plugging material layer 9 is formed on the end surface 5a, the ceramic honeycomb structure 10 is taken out of the container piece 11a horizontally along the inner bottom surface 11c. As shown in FIG. 2(c), when the plugging material layer 9 is brought into contact with the water-absorbing member 12, water in the slurry 8 forming the plugging material layer 9 and the plugs 4a is rapidly absorbed to the water-absorbing member 12. As a result, the lower end portions of the plugging material layer 9 and the plugs 4a are quickly solidified, preventing the generation of the recesses 7.

Figure 2D:
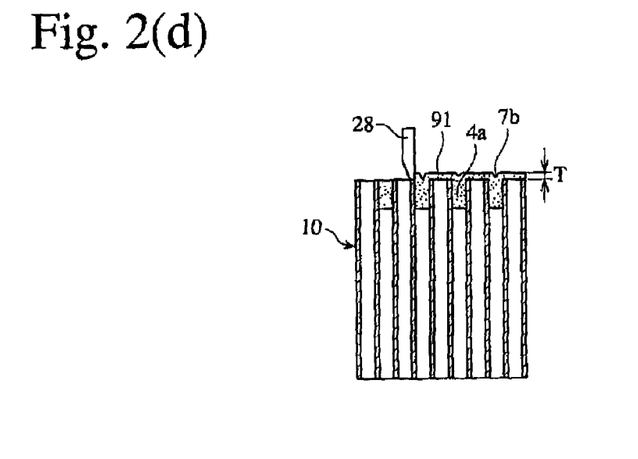
FIG. 2(d) is a cross-sectional view showing the step of removing a plugging material layer from the ceramic honeycomb structure provided with plugs.

As shown in FIG. 2(d), the plugging material layer 9 formed above a sealing film (not shown) and in contact with the water-absorbing member 12 is preferably removed from the sealing film using a spatula 28. Even if there were recesses 7b reaching the plugs 4a on the surface 91 of the plugging material layer 9, a portion of the plugging material layer 9 would fill the recesses 7 during the removal of the plugging material layer 9, resulting in the plugs 4a with little recesses 7 on the ends 45a.

The plugging material layer 9 preferably has a thickness of 0.5 to 5 mm. When the plugging material layer 9 is thinner than 0.5 mm, the recesses 7 easily reach the plugs 4a, and there is an insufficient plugging material for filling the recesses 7 reaching the plugs 4a, failing to fully filling the recesses. When the plugging material layer 9 is thicker than 5 mm, water in the plugs 4a does not easily move to the water-absorbing member 12 through the plugging material layer 9 during dewatering with the water-absorbing member 12 in contact with the end surface 5a of the ceramic honeycomb structure 10 taken out of the container, making it likely that the recesses 7 are generated in the plugs 4a. The thickness of the plugging material layer 9 is more preferably 0.5 to 3 mm, most preferably 0.5 to 2 mm.

(3) Pre-Treatment with Water

In the first and second methods, the end portions of the ceramic honeycomb structure 10 may be immersed in water before immersion in the plugging material slurry 8 in the container 11, to suppress water in the plugging material slurry 8 for the plugs 4a, 4b from being absorbed in the cell walls 2 of the ceramic honeycomb structure 10. When water in the plugging material slurry 8 is absorbed in the cell walls 2 of the ceramic honeycomb structure 10, the plugging material slurry 8 is solidified, resulting in the plugs 4a, 4b with uneven length in the flow paths, which generates large pressure loss and thus low filtering performance. Therefore, the preliminary immersion of the ceramic honeycomb structure 10 in water ensures the formation of the plugs 4a, 4b with equal length.

[3] Materials (1) Ceramic Honeycomb Structure

The ceramic honeycomb structure 10 may be formed by known materials, for example, heat-resistant ceramic powder such as alumina, zirconia, cordierite, mullite, silicon carbide, titanium carbide, silicon nitride, sialon, titanium nitride, aluminum nitride, lithium aluminum silicate, and aluminum titanate. Preferable is cordierite-forming material powder comprising kaolin powder, talc powder, silica powder and alumina powder, in a composition comprising, for instance, 48-52% by mass of $SiO_2$, 33-37% by mass of $Al_2O_3$, and 12-15% by mass of MgO.

Particularly in the case of a large ceramic honeycomb filter required to have high thermal shock resistance, which is 150 mm or more in outer diameter and total length, low-thermal-expansion ceramics such as cordierite, aluminum titanate and LAS are preferable. When a large amount of particulate matter in an exhaust gas is captured and accumulated to burn, ultra-heat-resistant ceramics such as silicon carbide and silicon nitride are preferable. These ceramics may be appropriately combined, and sintering aids may be added.

(2) Plugging Material Slurry

The plugging material slurry comprises heat-resistant ceramic powder such as cordierite, mullite, alumina, zirconia, silicon carbide, silicon nitride, aluminum nitride, titanium nitride, sialon, lithium aluminum silicate, and aluminum titanate; a binder such as methylcellulose, hydroxypropyl methylcellulose, and polyvinyl alcohol; and water. A dispersing agent or a pore-forming material may be added, if required. To have the same thermal expansion coefficient as that of the ceramic honeycomb structure to prevent heat cracking, substantially the same ceramic powder as in the ceramic honeycomb structure is preferably used.

Water is added in an amount of preferably 10 to 70 parts by mass, more preferably 20 to 60 parts by mass, based on 100 parts by mass of the ceramic powder. The binder is added in an amount of preferably 0.01 to 10 parts by mass, more preferably 0.1 to 5 parts by mass, based on 100 parts by mass of the ceramic powder. The viscosity of the plugging material slurry 8 is preferably adjusted to 5-300 Pa·s.

The present invention will be described in detail with reference to Examples below without intension of limitation.

EXAMPLE 1

(1) Production of Ceramic Honeycomb Structure

Kaolin powder, talc powder, silica powder, alumina powder, etc. were mixed to prepare cordierite-forming material powder having a composition of 48-52% by mass of $SiO_2$, 33-37% by mass of $Al_2O_3$, and 12-15% by mass of MgO. This powder was mixed with methylcellulose and hydroxypropyl methylcellulose as binders, and graphite as a lubricant/pore-forming material. After thorough dry-blending, water was added to carry out sufficient kneading to prepare a moldable ceramic material. This ceramic material was extrusion-molded and cut to a honeycomb-structure, molded article of 270 mm in diameter and 300 mm in length. This molded article was dried and sintered to produce a cordierite honeycomb structure 10 having a cell wall thickness of 0.3 mm, a porosity of 65%, an average pore size of 20 μm, and a flow path pitch of 1.5 mm. The end surfaces 5a, 5b of the ceramic honeycomb structure 10 were ground, and a sealing film was attached thereto. The film was provided with apertures at locations corresponding to the flow paths to be sealed of the ceramic honeycomb structure 10 in a checkerboard pattern.

(2) Preparation of Plugging Material Slurry 100 parts by mass of cordierite powder, about 30 parts by mass of water, and 2 parts by mass of methylcellulose were mixed to prepare a plugging material slurry 8.

(3) Production of Ceramic Honeycomb Filter

Figure 2E:
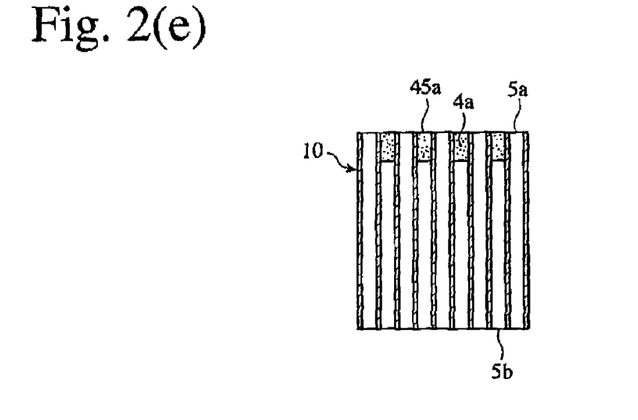
FIG. 2(e) is a cross-sectional view showing a ceramic honeycomb filter (having plugs on one end surface side) after the plugging material layer is removed.
Figure 2F:
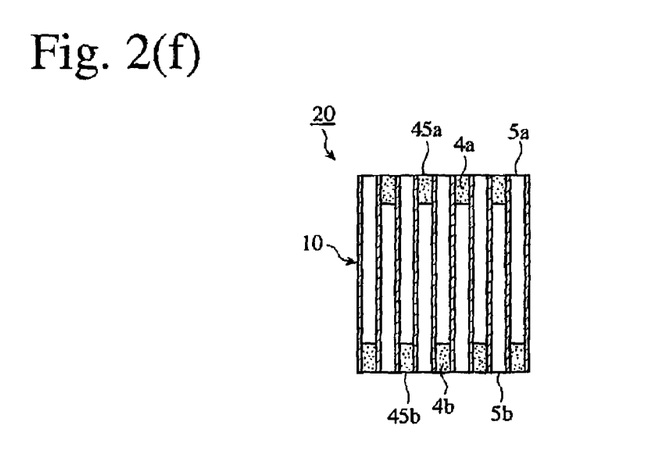
FIG. 2(f) is a cross-sectional view showing a ceramic honeycomb filter provided with plugs on both end surface sides.

As shown in FIGS. 1(a) and 1(b), an end portion (on the side of the end surface 5a) of the ceramic honeycomb structure 10 preliminarily wetted with water was immersed in the plugging material slurry 8 in a separable container 1, and pressed downward to form plugs 4a. As shown in FIGS. 1(c) and 1(d), after one container piece 11b of the separable container 11 was moved in the direction shown by the arrow A, the ceramic honeycomb structure 10 was moved horizontally (arrow B) along the bottom 111a of the container piece 11a and taken out. As shown in FIG. 2(f), after plugs 4b were similarly formed in the other end portion (on the side of the end surface 5b) of the ceramic honeycomb structure 10, sintering was conducted to produce a ceramic honeycomb filter 20.

EXAMPLE 2

As shown in FIG. 1(e), a ceramic honeycomb filter 20 was produced in the same manner as in Example 1, except that the end surface 5a (on the side of the plugs 4a) of the ceramic honeycomb structure 10 taken out of the separable container 11 was brought into contact with a water-absorbing member 12 (KIMTOWEL available from Nippon Paper Crecia Co., Ltd.) to absorb water in the plugs 4a (likewise, the end surface 5b was brought into contact with the water-absorbing member 12).

EXAMPLES 3 TO 7

Using the ceramic honeycomb structures 10 and the plugging material slurry 8 produced in the same manner as in Example 1, plugs 4a, 4b were formed in the same manner as in Example 1, except that the amount of the plugging material slurry 8 and the pressing force P were adjusted to form a plugging material layer 9 on each end surface 5a, 5b of the ceramic honeycomb structure 10 as shown in FIG. 2(a). The thickness T of the plugging material layer 9 was adjusted in a range of 0.5 to 5 mm as shown in Table 1 by changing the pressing force P in a range of 0.005 to 0.05 MPa.

Each ceramic honeycomb structure 10 was taken out of the container piece 11a horizontally in the same manner as in Example 1 as shown in FIG. 2(b). As shown in FIG. 2(c), the plugging material layer 9 on the end surface 5a of each ceramic honeycomb structure 10 was brought into contact with a water-absorbing member 12 (KIMTOWEL available from Nippon Paper Crecia Co., Ltd.) to absorb water in the plugs 4a and the plugging material layer 9. After the plugging material layer 9 was removed from a sealing film using a spatula 28 as shown in FIG. 2(d), the sealing film was removed as shown in FIG. 2(e). Likewise, the plugs 4b were formed on the other end surface 5b. The plugs 4a, 4b were sintered to produce each ceramic honeycomb filter 20.

COMPARATIVE EXAMPLES 1 TO 3

The ceramic honeycomb filters 20 of Comparative Examples 1 to 3 were produced in the same manner as in Examples 1, 2 and 4, respectively, except that each ceramic honeycomb structure 10 having a plugging material slurry 8 was taken out of a container upward.

The recessing ratio in each ceramic honeycomb filter 20 of Examples 1 to 7 and Comparative Examples 1 to 3 was calculated using the following formula. The results are shown in Table 1.

Recessing ratio=[(number of flow paths having recesses)/(number of plugged flow paths)]×100 (%)

TABLE 1

| No. | Taking-Out Method | De-watering | Plugging Material Layer Thickness T (mm) | Removal | Recessing Ratio (%) |
|---|---|---|---|---|---|
| Example 1 | (1) | No | 0 | No | 3.0 |
| Example 2 | (1) | Yes | 0 | No | 1.5 |
| Example 3 | (1) | Yes | 0.5 | Yes | 0.8 |
| Example 4 | (1) | Yes | 1 | Yes | 0.5 |
| Example 5 | (1) | Yes | 2 | Yes | 0.7 |
| Example 6 | (1) | Yes | 3 | Yes | 1.5 |
| Example 7 | (1) | Yes | 5 | Yes | 2.5 |
| Comparative Example 1 | (2) | No | 0 | No | 40 |
| Comparative Example 2 | (2) | Yes | 0 | No | 35 |
| Comparative Example 3 | (2) | Yes | 1 | Yes | 30 |

Notes:
(1) The ceramic honeycomb structure was taken out of the container horizontally.
(2) The ceramic honeycomb structure was taken out of the container upward.

Since each ceramic honeycomb structure of Examples 1 to 7 was taken out of the container horizontally as shown in Table 1, the recessing ratio was as low as 0.5-3.0%. Particularly because water in the plugs 4a, 4b (or the plugs 4a, 4b and the plugging material layer 9) was absorbed by the water-absorbing member in Examples 2 to 7, the recessing ratio was as low as 0.5-2.5%. Because the plugging material layers 9 of Examples 3 to 5 had thickness in the most preferred range of 0.5 to 2.0 mm, their recessing ratios were as very low as 0.5-0.8%. On the other hand, because the ceramic honeycomb structures 10 of Comparative Examples 1 to 3 were taken out of the container upward, their recessing ratios were as high as 30-40%.

Although the plugs were formed in the sintered ceramic honeycomb structures in the above Examples, the plugs may be formed in a dried molded article having a honeycomb structure, followed by their simultaneous sintering.

EFFECTS OF THE INVENTION

Surely avoiding the generation of recesses at plug ends without reducing the effective length of flow paths, the method of the present invention produces a high-performance ceramic honeycomb filter free from through-holes permitting particulate matter in an exhaust gas to leak.

What is claimed is:

1. A method for producing a ceramic honeycomb filter comprising:
    immersing an end portion of a ceramic honeycomb structure having a lot of flow paths partitioned by cell walls in a plugging material slurry in a container having such a structure that at least part of a sidewall of the container is detachable over a sufficient width to slide the ceramic honeycomb structure;
    pressing said honeycomb structure downward to introduce the plugging material slurry into the predetermined flow paths to form plugs;
    detaching the part of the sidewall of the container horizontally; and
    horizontally moving the ceramic honeycomb structure out of the container through the area where the part of the sidewall has been detached.

2. The method for producing a ceramic honeycomb filter according to claim 1, wherein an end surface of the taken-out ceramic honeycomb structure is brought into contact with a water-absorbing member.

3. A method for producing a ceramic honeycomb filter comprising:
    immersing an end portion of a ceramic honeycomb structure having a lot of flow paths partitioned by cell walls in a plugging material slurry in a container and pressing said honeycomb structure downward, thereby introducing the plugging material slurry into the predetermined flow paths to form plugs, and forming a plugging material layer on the end surface of the ceramic honeycomb structure;
    taking the ceramic honeycomb structure together with the plugging material layer out of the container horizontally; and
    placing the ceramic honeycomb structure with the plugging material layer on a water-absorbing member selected from the group consisting of paper, woven or unwoven fabrics of natural or synthetic fibers, and foamed plastics.

4. The method for producing a ceramic honeycomb filter according to claim 3, wherein the plugging material layer is removed after the ceramic honeycomb structure with the plugging material layer is placed on the water-absorbing member.

5. The method for producing a ceramic honeycomb filter according to claim 3, wherein the plugging material layer has a thickness of 0.5 to 5 mm.

6. The method for producing a ceramic honeycomb filter according to claim 1, wherein an end portion of the ceramic honeycomb structure is immersed in water before being immersed in a plugging material slurry in the container.

7. The method for producing a ceramic honeycomb filter according to claim 3, wherein an end portion of the ceramic honeycomb structure is immersed in water before being immersed in a plugging material slurry in the container.

8. The method for producing a ceramic honeycomb filter according to claim 1, wherein one of detachable container pieces composing said container, having smaller contact area with the bottom of the ceramic honeycomb structure is slid horizontally, before taking the ceramic honeycomb structure provided with the plugs out of the container horizontally.

* * * * *